Sept. 4, 1951     G. C. WYMAN     2,566,544
GLASS CUTTER WHEEL HEAD
Filed Aug. 25, 1950

INVENTOR.
GUY C. WYMAN
BY
Benj. T. Rauber
ATTORNEY

Patented Sept. 4, 1951

2,566,544

UNITED STATES PATENT OFFICE 2,566,544

GLASS CUTTER WHEEL HEAD

Guy C. Wyman, Chatham, N. J., assignor to Red Devil Tools, Irvington, N. J., a corporation of New Jersey Application August 25, 1950, Serial No. 181,330

2 Claims. (Cl. 49—52)

My present invention relates to glass cutter wheel heads, that is, to the head or holder of a wheel for scoring a sheet or plate of glass.

The cutting wheel of a glass cutter and its supporting axle wear more rapidly than the head or other carriers of the wheel and axle and must be replaced at intervals. For this purpose the wheel and axle are held in place by a spring clip tensioned between the axle and a retaining ledge or recess on the head on which the wheel and axle are mounted.

To remove the wheel for replacement, the clip may be swung free of the retaining ledge. To replace a new wheel and axle, the axle is secured to the clip, placed in position and held by slipping the clip on the ledge or recess of the stem. The wheel and axle and clip are necessarily small and for this reason are difficult to handle and to replace on the head.

In my present invention I provide an axle and wheel assembly which is inexpensive to construct and in which the wheel is held from slipping from the axle so that the wheel and axle may be easily attached to the head.

Inasmuch as the wheel and axle are made as a unit and as the wheel cannot slip or be removed from the axle, there is no possibility of a worn or defective axle being used and, accordingly, no possibility of a defective or improper mounting of the wheel. The invention also avoids any possibility of the axle slipping from the clip.

In the cutting head of my invention, a supporting stem is bifurcated at its free end to provide a slot for receiving the cutting wheel and is also notched transversely of the slot for the mounting of an axle supporting the cutting wheel and spanning the slot.

The axle projects slightly beyond the sides of the bifurcated end and is widened or deformed outwardly at each end which prevents the cutting wheel from slipping off the axle when being handled or mounted on the cutter head or stem.

In mounting the cutter wheel and axle, the wheel is inserted into the slot and the axle mounted in the transverse notch which projects from each side of the stem. A U-shaped wire clip having its ends bent into the form of hooks is then hooked onto the projecting ends of the axle outside of the bifurcated stem of the head and is swung into or onto a recess or ledge of the head so as to hold the axle and wheel with a tension into the transverse notch. To detach the cutter wheel and axle it is only necessary to slip the clip free from the ledge, whereupon the axle will be released.

The various features of the invention are illustrated, by way of example, in the accompanying drawings in which.

Figure 1:
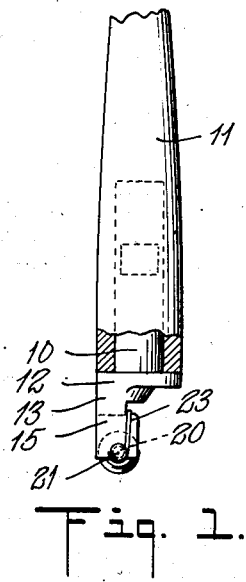
Fig. 1 is a side elevation of a cutter head embodying a preferred form of the invention.
Figure 2:
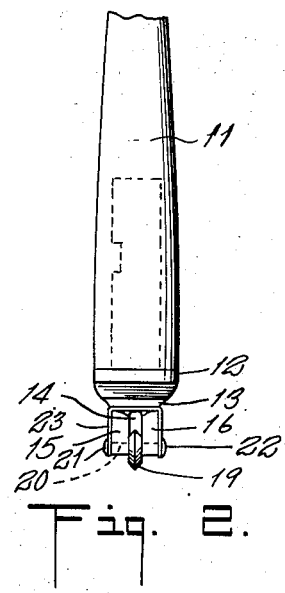
Fig. 2 is a view taken from the right of Fig. 1.

In the embodiment of the invention shown in the accompanying drawings, the head comprises a stem 10 mounted in a recess in the lower end of a holder 11. The stem may be in fixed position in the holder but when used for cutting eyeglass blanks, or other similar articles, it is rotatably mounted in the recess of the holder. The downward thrust of the holder 11 is received on a flange 12 at the lower end of the stem 10. Offset from the stem is a shank 13, the offset giving the head a swiveling action so that the cutting wheel follows in a proper position as the holder is moved about the perimeter of the area to be cut. The shank 13 is bifurcated to form a wheel-receiving slot 14 between a pair of branches 15 and 16, the lower ends of which are notched (as shown particularly in Fig. 3) at 17 transversely of the wheel-receiving slot 14. At a distance above the lower end of the shank 13 is a hook-receiving recess or ledge 18.

A cutting wheel 19 is, in accordance with the invention, rotatably mounted on an axle 20 the ends of which are upset as at 21 and 22 forming heads which retain the wheel on the axle, which prevent it from slipping or falling therefrom.

The axle 20 may be made of a solid cylindrical rod which may be easily and inexpensively upset to form the heads 21 and 22.

The wheel and axle are mounted in position by slipping the wheel into the slot 14 and the axle into the notch 17, the axle projecting at each end slightly from the sides of the shank, thus leaving sufficient space between the heads 21 and 22 and the side faces of the shank to receive the ends of a wire clip 23.

Figure 3:
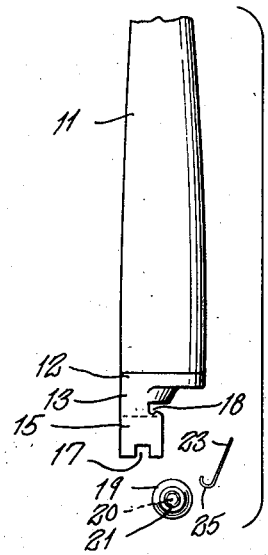
Fig. 3 is a view similar to that of Fig. 1 but showing the axle, cutting wheel and clip removed from the head.
Figure 4:
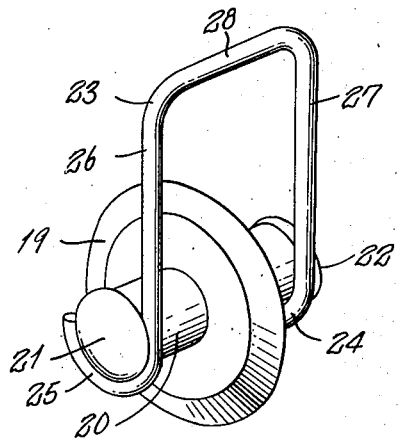
Fig. 4 is a perspective view on a greatly enlarged scale of the cutter wheel, axle and clip.

The clip 23 comprises a pair of hooked ends as shown at 24 and 25, Fig. 3, which may be hooked onto the projecting ends of the axle 20. The clip then extends upwardly of the side lengths 26 and 27 to a connecting cross-portion 28. The lengths 26 and 27 are just of sufficient length to permit the cross-portion 28 to slip into the recess 18 with tension on the axle to hold it firmly and securely in the notches 17.

In the above invention each wheel is provided with an axle so that both are removed and replaced as a unit. The axle may be made from relatively cheap bar stock and readily upset at its ends to form the head. These heads retain the wheel on the axle so that it cannot be lost therefrom or misplaced when being inserted into the slot.

As there is no wear on the clip it may be used repeatedly for mounting successive wheel and axle assemblies. As it is held from spreading, there is no danger of its sliding from the axle and permitting the latter to slip free of the scoring notch.

The invention, therefore, provides a head in which the wheel may be readily and easily mounted and replaced without danger of re-use of worn parts.

Having described my invention, what I claim is:

1. A glass cutter wheel head which comprises a supporting stem having an end bifurcated to provide a wheel-receiving slot and having a sidewise slot to form a transverse retaining ledge spaced from said end, said end being notched transversely of said slot to receive an axle spanning said slot, an axle mounted in said notch to project at each side of said stem and being enlarged at each end, and a U-shaped clip having a bight bearing on said ledge, a pair of legs extending from said bight one on each side of said head to said transverse notch and hook shaped at said ends and hooked to the projecting ends of said axle to hold said axle in said notch by direct tension from said ledge.

2. The glass cutter wheel head of claim 1 in which said axle is solid and is upset at each end to form retaining heads.

GUY C. WYMAN.

REFERENCES CITED

The following references are of record in the file of this patent:

UNITED STATES PATENTS

| Number | Name | Date |
|---|---|---|
| 742,179 | Fletcher | Oct. 27, 1903 |
| 766,827 | Hughes | Aug. 9, 1904 |
| 1,865,242 | Eldredge | June 28, 1932 |
| 1,870,585 | Parks et al. | Aug. 9, 1932 |
| 2,096,284 | Lee | Oct. 19, 1937 |
| 2,254,162 | Wyman | Aug. 26, 1941 |